HOMOGENEOUS COMPOSITIONS OF AMMONIUM NITRATE, MONOAMMONIUM PHOSPHATE, AND DIAMMONIUM PHOSPHATE

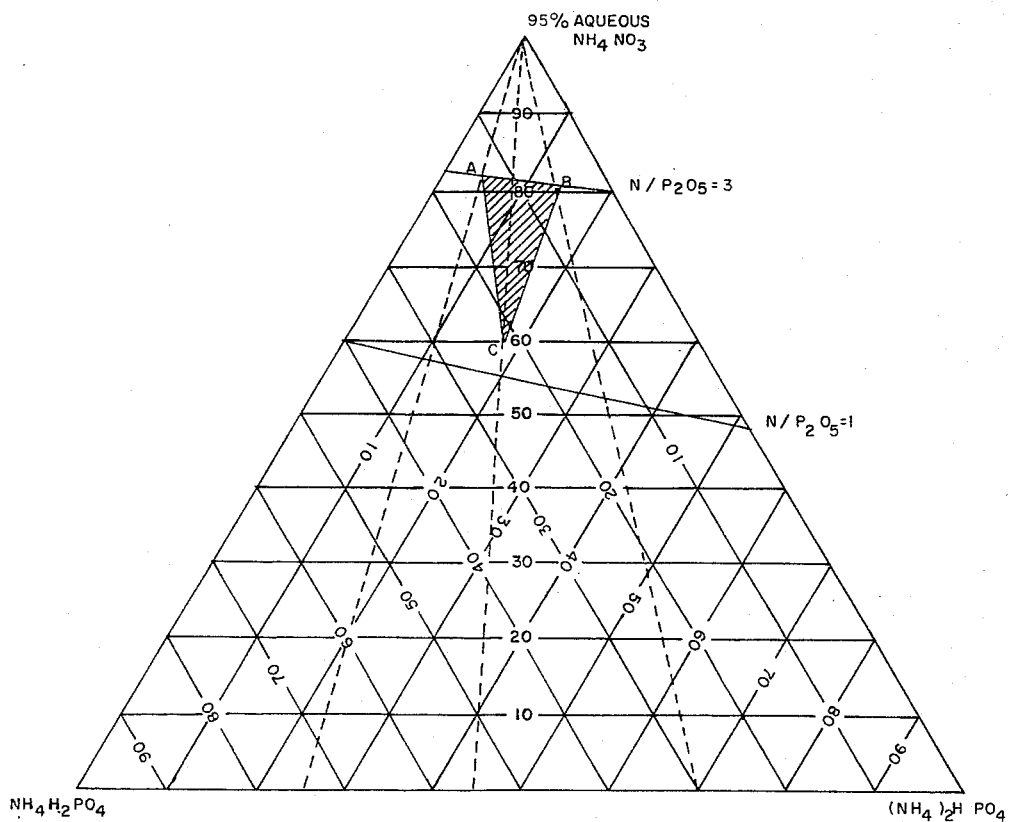
INVENTORS
James G. Mac Arthur
Glenn A. Terry
BY Billy W. Threadgill
Willard C. Bull
Carl A. Cline
AGENT

James G. MacArthur, Mission, Kans., Billy W. Threadgill, Parkville, Mo., and Glenn A. Terry and Willard C. Bull, Prairie Village, Kans., assignors to Gulf Oil Corporation, Pittsburgh, Pa., a corporation of Pennsylvania
Filed Aug. 10, 1966, Ser. No. 571,553
1 Claim. (Cl. 71—50)

This application is a continuation-in-part of U.S. Ser. No. 441,820, filed Mar. 22, 1965, now abandoned, as a continuation-in-part of U.S. Ser. No. 87,081, filed Feb. 6, 1961, now abandoned.

This invention relates to homogeneous liquid compositions of certain inorganic salts which possess utility in the manufacture of nitrogen-phosphorus fertilizer by prilling.

Clear liquid homogeneous compositions consisting of ammonium nitrate and ammonium phosphates are difficult to prepare, if a high phosphate content is desired. Compositions of ammonium nitrate and diammonium phosphate are unstable in the liquid state because at temperatures above the freezing point, decomposition of diammonium phosphate occurs. On the other hand, compositions consisting of ammounium nitrate and monoammonium phosphate also have very high freezing points and at liquid temperatures there is danger of decomposition of the ammoninm nitrate.

We have discovered that a specific range of compositions consisting of ammonium nitrate, monoammonium phosphate and diammonium phosphate have freezing points within the range of about 120° C. to 145° C. and so may be kept as clear homogeneous liquids at temperatures below about 150° C. without substantial decomposition. These compositions may be prilled in conventional ammonium nitrate prilling equipment at ordinary ammonium nitrate prilling temperatures to yield products having $N/P_2O_5$ ratios within the range of 1 to 3, which are useful as fertilizers.

In preparing these compositions, it is preferred to start with clear liquid 95% aqueous ammonium nitrate liquor at a temperature of about 135–150° C. and dissolve the desired amounts of ammonium phosphates therein. More than 5 percent water in the ammonium nitrate liquor is not desirable because this may necessitate considerable readjustment of the operating conditions in the prilling tower to obtain a dry product. Although 97 percent to 98 percent ammonium nitrate liquor may also be used, reduction in moisture content prior to use merely involves unnecessary expense.

The monoammonium phosphate and diammonium phosphate employed in the liquid compositions of this invention can be of any source so long as the preparations do not have an excessive amount of extraneous and interfering matter. It has been found that monoammonium phosphate and diammonium phosphate such as provided by the reaction of ammonia with phosphoric acid such as obtained by the "furnace process" is suitable. The ammonium nitrate employed can be such ammonium nitrate as is customarily used in particularization of this substance by prilling.

In utilizing the liquid compositions of this invention to prepare a prilled ammonium nitrate-phosphate fertilizer product, droplets of the liquid are passed or sprayed through a conventional prilling tower in the usual manner so as to provide the desired prills. An example of a prilling tower that has been found suitable for this purpose is described in United States Patent No. 2,528,407 issued to William W. Yeandle, Oct. 31, 1950. The prills comprising ammonium nitrate, monoammonium phosphate, and diammonium phosphate in intimate admixture and in the intended ratios are dried and treated in any other desired manner such as coating with a small amount of a water repellent agent or anti-caking agent such as diatomaceous earth, and the like.

The drawing is a triangular composition chart for the three-component system 95 percent $NH_4NO_3$, $NH_4H_2PO_4$ and $(NH_4)_2HPO_4$. Two lines are drawn across the chart to indicate compositions in which $N/P_2O_5$ ratios are 1 and 3 respectively.

The liquid compositions of this invention are those indicated by the shaded triangle defined by the points A, B and C. These points are located as follows:

A represents a composition consisting of about 83 percent by weight of 95 percent ammonium nitrate liquor, the balance consisting of a mixture of 75 weight percent monoammonium phosphate and 25 weight percent diammonium phosphate.

B represents a composition consisting of about 81 percent by weight of 95 percent ammonium nitrate liquor, the balance consisting of a mixture of 70 weight percent diammonium phosphate and 30 weight percent monoammonium phosphate.

C represents a composition consisting of about 60 percent by weight 95 percent ammonium nitrate liquor, the balance consisting of a mixture of 55 weight percent monoammonium phosphate and 45 weight percent diammonium phosphate.

The data set out in the following Table I exemplify compositions which lie within the limits of ammonium nitrate, monoammonium phosphate and diammonium phosphate set forth above. Also included for purposes of comparison are data on some compositions which lie outside, but near the specified ranges, showing that these compositions freeze above the specified temperature range. The freezing points listed in the table represent the theoretical minimum prilling temperatures of the combinations. In practice, however, a higher operating temperature for prilling than the minimum melting point temperatures should be selected which will provide a safety margin to prevent possible salting out and resultant plugging if some variation in the system occurs, such as slight reduction in temperature of the melt, presence of a trace of impurity in the melt, and the like. Melting and freezing points of the compositions were determined in sealed tubes.

In the table, MAP represents monoammonium phosphate and DAP represents diammonium phosphate. The freezing point of the composition containing 60 percent aqueous ammonium nitrate and 40 percent phosphate represented by point C in FIGURE 1 is shown in the table to be about 140° C. This provides a satisfactory margin of safety when the operating temperature varies from 145° to 150° C. during production of the compositions of highest phosphate content.

TABLE I

[Freezing Points and Compositions of 95 Percent Aqueous Ammonium Nitrate-Phosphate Mixtures]

| Phosphate Comp. MAP:DAP (Pts. by wt.) | Percent Phos. Comp. in Melt (by wt. based on wt. of NH₄NO₃) | F.P. of Mixt., ° C. | P₂O₅ Percent by wt. (anhyd. basis) | N Percent by wt (anhyd. basis) |
|---|---|---|---|---|
| Control (95% NH₄NO₃) | 0 | 122–8 | 0 | 35.0 |
| 55:45 | 20 | 128–9 | 12.1 | 31.1 |
| 100:0 | 21 | 167–8 | 13.5 | 30.0 |
| 75:25 | 21 | 150–1 | 13.1 | 30.6 |
| 64:36 | 21 | 142–3 | 12.9 | 30.7 |
| 40:60 | 21 | 139–40 | 12.5 | 31.2 |
| 25:75 | 21 | 152–3 | 12.2 | 31.5 |
| 0:100 | 21 | 174–5 | 11.8 | 32.0 |
| 100:0 | 30 | 179–80 | 19.2 | 27.9 |
| 75:25 | 30 | 161–2 | 18.6 | 28.7 |
| 64:36 | 30 | 147–8 | 18.3 | 28.9 |
| 55:45 | 30 | 134–5 | 18.1 | 29.2 |
| 40:60 | 30 | 150–1 | 17.7 | 29.6 |
| 0:100 | 30 | 191–2 | 16.7 | 30.7 |
| 55:45 | 40 | 138–140 | 23.9 | 25.2 |
| 55:45 | 45 | 144–145 | 26.6 | 23.8 |
| 55:45 | 50 | 148–9 | 29.9 | 22.4 |

Following is an example of the preparation of a clear homogeneous liquid composition within the range represented on the triangular composition diagram, followed by prilling to yield a solid product in which the $N/P_3O_5$ ratio is approximately 3. Parts given are parts by weight.

*Example*

There are combined in a heated vessel fitted with a stirrer, 50 parts of a mixture of monoammonium phosphate and diammonium phosphate in a 64:36 weight ratio, 300 parts of ammonium nitrate and 15 parts of water. The combination is heated, with stirring, to 150° C., yielding a clear, homogeneous liquid composition having a freezing point of about 138–140° C. which is prilled in a pilot-plant size prilling tower of circular cross-section, 30 inches in diameter and a height of 140 feet. Firm, spherical white prills are formed, which, after drying have the following analysis:

```
                                                  Percent
N _____ 30.07
P₂O₅ _____ 10.85
H₂O _____  1.15
```

What is claimed is:

A clear, homogeneous liquid composition having a freezing point within the range of 120° C. to 145° C. consisting of aqueous ammonium nitrate of at least 95 percent concentration and a mixture of monoammonium phosphate and diammonium phosphate, the proportions of the components of said composition being limited to those represented by points lying within a triangular area defined by straight lines connecting the points, (A) representing a composition consisting of about 83 percent by weight of 95 percent ammonium nitrate, the balance consisting of a mixture of 75 weight percent monoammonium phosphate and 25 weight percent diammonium phosphate, (B) representing a composition consisting of about 81 percent by weight of 95 percent ammonium nitrate, the balance consisting of a mixture of 70 weight percent diammonium phosphate and 30 weight percent monoammonium phosphate, and (C) representing a composition consisting of about 60 percent by weight of 95 percent ammonium nitrate, the balance consisting of a mixture of 55 weight percent monoammonium phosphate and 45 weight percent diammonium phosphate, said points being plotted on a triangular composition diagram of the system 95 percent ammonium nitrate-monoammonium phosphate-diammonium phosphate.

References Cited by the Examiner

UNITED STATES PATENTS 3,037,855   6/1962   Smith _____ 71—64

DONALL H. SYLVESTER, *Primary Examiner.*

R. BAJEFSKY, *Assistant Examiner.*